United States Patent
Kim et al.

(10) Patent No.: US 9,378,574 B2
(45) Date of Patent: Jun. 28, 2016

(54) APPARATUS AND METHOD FOR PRODUCING MAKEUP AVATAR

(71) Applicants: Electronics and Telecommunications Research Institute, Daejeon (KR); Myongji University Industry and Academia Cooperation Foundation, Yongin-si (KR)

(72) Inventors: Jin Seo Kim, Daejeon (KR); In Su Jang, Daegu (KR); Soon Young Kwon, Yangsan (KR); Song Woo Lee, Daejeon (KR); Ju Yeon You, Daegu (KR); Jae Woo Kim, Daejeon (KR); Sang Kyun Kim, Yongin (KR); Yong Soo Joo, Seoul (KR)

(73) Assignees: ELECTRONICS AND TELECOMMUNICATIONS RESEARCH INSTITUTE, Daejeon (KR); MYONGJI UNIVERSITY INDUSTRY AND ACADEMIA COOPERATION FOUNDATION, Yongin-Si (KR)

( * ) Notice: Subject to any disclaimer, the term of this patent is extended or adjusted under 35 U.S.C. 154(b) by 257 days.

(21) Appl. No.: 13/754,222

(22) Filed: Jan. 30, 2013

(65) Prior Publication Data

US 2013/0286036 A1   Oct. 31, 2013

(30) Foreign Application Priority Data

Apr. 26, 2012 (KR) .......................... 10-2012-0043569
Jan. 8, 2013 (KR) .......................... 10-2013-0002021

(51) Int. Cl.
*G09G 5/02* (2006.01)
*G06T 13/00* (2011.01)
*G06T 19/00* (2011.01)

(52) U.S. Cl.
CPC ................ *G06T 13/00* (2013.01); *G06T 19/00* (2013.01); *G06T 2200/24* (2013.01)

(58) Field of Classification Search
None
See application file for complete search history.

(56) References Cited

U.S. PATENT DOCUMENTS

| 7,392,204 B1 * | 6/2008 | Matsumoto et al. ......... 705/7.32 |
| 2005/0147955 A1 * | 7/2005 | Giacchetti ..................... 434/377 |
| 2006/0239591 A1 * | 10/2006 | Kim .................. G06F 17/30038 382/305 |
| 2012/0223956 A1 * | 9/2012 | Saito et al. .................... 345/582 |

FOREIGN PATENT DOCUMENTS

JP   4477951   3/2010

* cited by examiner

*Primary Examiner* — Xiao Wu
*Assistant Examiner* — Mohammad H Akhavannik
(74) *Attorney, Agent, or Firm* — Staas & Halsey LLP

(57) ABSTRACT

An apparatus and method for producing a makeup avatar is disclosed. The apparatus may include a spectrum information metadata generating unit to generate spectrum information metadata, based on skin spectrum information of a user and cosmetics spectrum information related to makeup, a makeup information generating unit to receive, from the user, a makeup avatar to which makeup is applied through a user terminal, and to generate makeup information of the makeup avatar, a control information determining unit to determine control information for controlling a makeup status of the makeup avatar, based on the makeup information and the spectrum information metadata, and a makeup avatar metadata generating unit to generate makeup avatar metadata, based on spectrum information metadata corresponding to the control information and the makeup information.

16 Claims, 4 Drawing Sheets

APPARATUS AND METHOD FOR PRODUCING MAKEUP AVATAR

CROSS-REFERENCE TO RELATED APPLICATIONS

This application claims the benefit of Korean Patent Application No. 10-2012-0043569, filed on Apr. 26, 2012, and Korean Patent Application No. 10-2013-0002021, filed on Jan. 8, 2013, in the Korean Intellectual Property Office, the disclosures of which are incorporated herein by reference.

BACKGROUND

1. Field of the Invention

The present invention relates to an apparatus and method for producing a makeup avatar, and more particularly, to an apparatus for producing a makeup avatar that may reproduce a realistic skin color of the makeup avatar based on skin information of a user and cosmetics information related to makeup.

2. Description of the Related Art

A conventional apparatus for reproducing an avatar skin may reproduce a skin tone of an avatar by applying makeup to the avatar using virtual makeup tools. The conventional apparatus may reproduce the skin tone of the avatar through a combination of colors of the makeup tools existing in a virtual reality environment.

However, in a conventional method of reproducing an avatar skin, reproducing a skin tone identical to a skin tone of a user to which makeup is applied in reality may be difficult. Such difficulty is present because a difference in a scheme of expressing a skin tone exists between virtual reality and reality. In addition, the conventional method lacks technology for reproducing the skin tone of the avatar to be similar to the skin tone of the user.

Accordingly, there is a desire for a technology of reproducing a realistic skin color in order to obtain a result identical to a result of applying makeup in reality when makeup is applied to a virtual avatar using virtual makeup tools.

SUMMARY

An aspect of the present invention provides an apparatus and method for producing a makeup avatar that may apply makeup to a makeup avatar using skin spectrum information of a user and cosmetics spectrum information related to makeup, thereby reproducing a realistic skin color with a skin tone identical to a skin tone of the user to which makeup is applied in reality.

Another aspect of the present invention also provides an apparatus and method for producing a makeup avatar that may reproduce a realistic skin color of a makeup avatar with a skin tone identical to a skin tone of a user to which makeup is applied in reality, thereby reducing expenses and time to be to be expended on a planning meeting relating to makeup in a broadcasting field, a theater field, and the like requiring normal makeup or special effects makeup.

Still another aspect of the present invention also provides an apparatus and method for producing a makeup avatar that may reproduce a realistic skin color of a makeup avatar with a skin tone identical to a skin tone of a user to which makeup is applied in reality, thereby alleviating wasting of makeup resources and environmental pollution issues occurring during an education in an educational field of normal makeup or special effects makeup.

According to an aspect of the present invention, there is provided an apparatus for producing a makeup avatar, the apparatus including a spectrum information metadata generating unit to generate spectrum information metadata, based on skin spectrum information of a user and cosmetics spectrum information related to makeup, a makeup information generating unit to receive, from the user, a makeup avatar to which makeup is applied through a user terminal, and to generate makeup information of the makeup avatar, a control information determining unit to determine control information for controlling a makeup status of the makeup avatar, based on the makeup information and the spectrum information metadata, and a makeup avatar metadata generating unit to generate makeup avatar metadata, based on spectrum information metadata corresponding to the control information and the makeup information.

The spectrum information metadata generating unit may generate the spectrum information metadata, based on skin spectrum information corresponding to skin information of the user, and cosmetics spectrum information related to color information of cosmetics.

The makeup avatar may include ethnic information varying depending on the skin spectrum information.

The makeup information generating unit may generate makeup information including at least one of a makeup region and a makeup tool used for applying the makeup, based on a result of applying the makeup to the makeup avatar.

The makeup avatar metadata generating unit may generate the makeup avatar metadata, by extracting skin spectrum information indicating skin information of the makeup avatar based on the makeup information.

The makeup avatar metadata generating unit may generate the makeup avatar metadata, by extracting cosmetics spectrum information related to information on cosmetics used for applying the makeup to the makeup avatar based on the makeup information.

The makeup avatar metadata generating unit may generate, based on the control information, makeup avatar metadata for the makeup avatar of which the makeup status is controlled based on the extracted skin spectrum information and the extracted cosmetics spectrum information.

According to another aspect of the present invention, there is also provided a method of producing a makeup avatar, the method including generating spectrum information metadata, based on skin spectrum information of a user and cosmetics spectrum information related to makeup, receiving, from the user, a makeup avatar to which makeup is applied through a user terminal, and generating makeup information of the makeup avatar, determining control information for controlling a makeup status of the makeup avatar, based on the makeup information and the spectrum information metadata, and generating makeup avatar metadata, based on spectrum information metadata corresponding to the control information and the makeup information.

The generating of the spectrum information metadata may include generating the spectrum information metadata, based on skin spectrum information corresponding to skin information of the user, and cosmetics spectrum information related to color information of cosmetics.

The makeup avatar may include ethnic information varying depending on the skin spectrum information.

The generating of the makeup information of the makeup avatar may include generating makeup information including at least one of a makeup region and a makeup tool used for applying the makeup, based on a result of applying the makeup to the makeup avatar.

The generating of the makeup avatar metadata may include generating the makeup avatar metadata, by extracting skin spectrum information indicating skin information of the makeup avatar based on the makeup information.

The generating of the makeup avatar metadata may include generating the makeup avatar metadata, by extracting cosmetics spectrum information related to information on cosmetics used for applying the makeup to the makeup avatar based on the makeup information.

The generating of the makeup avatar metadata may include generating, based on the control information, makeup avatar metadata for the makeup avatar of which the makeup status is controlled based on the extracted skin spectrum information and the extracted cosmetics spectrum information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
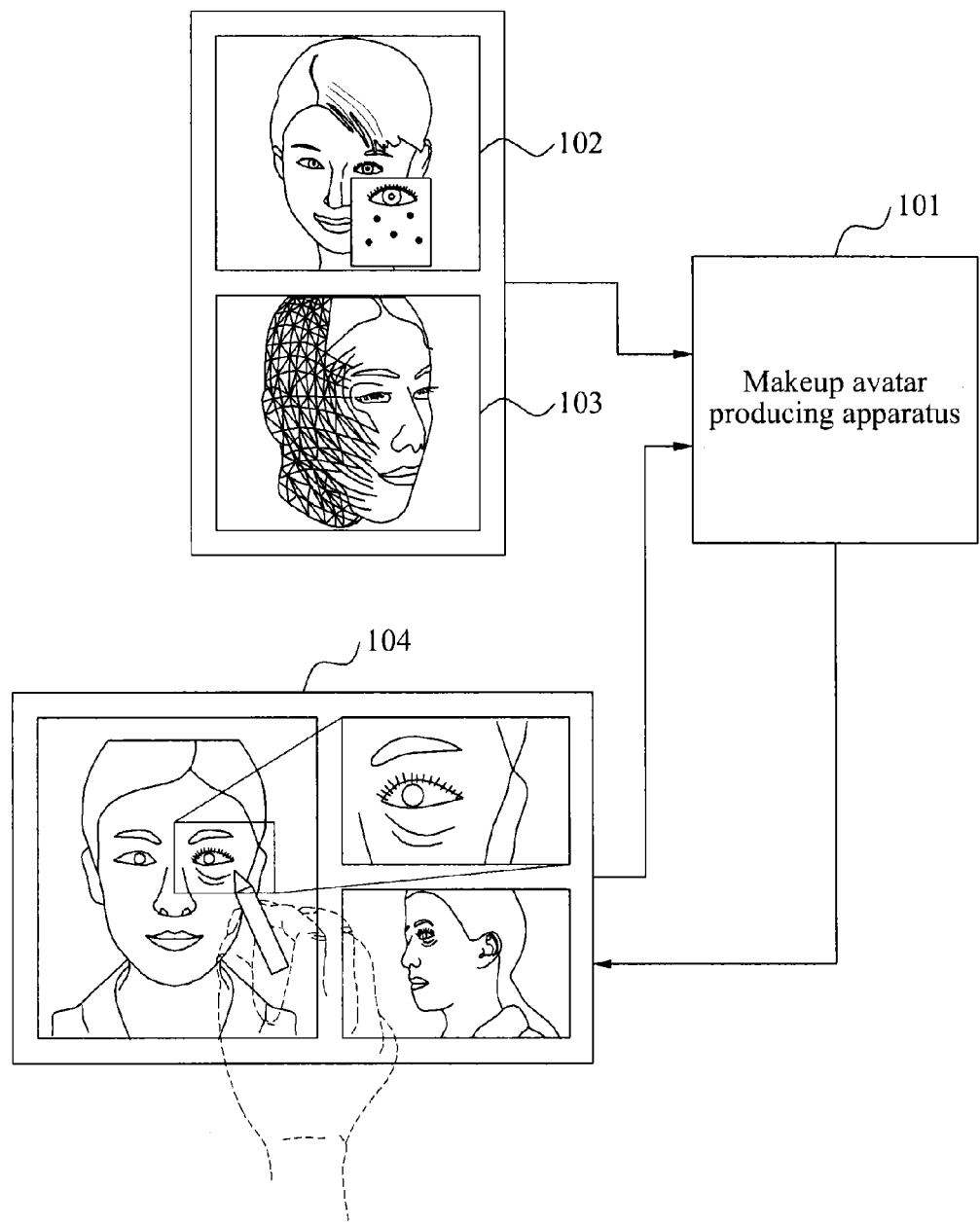
FIG. 1 is a diagram illustrating an apparatus for producing a makeup avatar according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an apparatus 101 for producing a makeup avatar according to an embodiment of the present invention. Hereinafter, the apparatus for producing the makeup avatar will be referred to as the "apparatus."

Referring to FIG. 1, the apparatus 101 may generate spectrum information metadata, based on skin spectrum information 102 and cosmetics spectrum information related to makeup. In this instance, the skin spectrum information 102 and the cosmetics spectrum information may be measured by a spectrum measuring apparatus (not shown). The skin spectrum information 102 may refer to information related to skin information of a user. In particular, the skin spectrum information 102 may refer to skin expression information of a makeup avatar that may be used to express a skin color of the user used in reality. In addition, the cosmetics spectrum information may refer to information related to color information of cosmetics. Cosmetic colors may refer to colors of cosmetics used for applying normal makeup or special effects makeup in reality. In particular, the cosmetics spectrum information may refer to color information of makeup cosmetics used in reality, and may correspond to color information of cosmetics to be applied to the makeup avatar.

The apparatus 101 may include ethnic information of a makeup avatar 103, and the ethnic information may vary depending on the skin spectrum information 102. The apparatus 101 may produce the makeup avatar 103 corresponding to the skin spectrum information 102.

Here, the user may be provided with the makeup avatar 103 through a user terminal 104. The user terminal 104 may refer to a device capable of receiving the makeup avatar 103. For example, the user terminal 104 may include a cellular phone, a tablet, a laptop, and the like. The user may apply makeup to the provided makeup avatar 103, using a virtual makeup tool. The virtual makeup tool may include an electronic touch pen provided by the apparatus 101, and the like. In particular, the user may apply the makeup on a skin of the makeup avatar 103, using the virtual makeup tool, for example, the electronic touch pen, and the like.

The apparatus 101 may receive, from the user, the makeup avatar 103 to which the makeup is applied through the user terminal 104. The apparatus 101 may generate makeup information of the makeup avatar 103, using the received makeup avatar 103. The makeup information may include information related to the makeup applied to the makeup avatar 103. Here, the makeup information may include, for example, a region to which the makeup is applied, a virtual makeup tool used by the user for applying the makeup to the makeup avatar 103, and the like.

The apparatus 101 may determine control information for controlling a makeup status of the makeup avatar 103, based on the spectrum information metadata and the makeup information. The apparatus 101 may generate makeup avatar metadata, based on spectrum information metadata corresponding to the determined control information and the makeup information. In addition, the apparatus 101 may provide the generated makeup avatar metadata to the user terminal 104.

The apparatus 101 may reproduce a skin of the makeup avatar 103 with a realistic skin color corresponding to the makeup information regarding the makeup applied by the user to the makeup avatar 103, based on the generated makeup avatar metadata.

In addition, the apparatus 101 may apply makeup to the makeup avatar 103 based on the skin spectrum information 102 of the user and the cosmetics spectrum information related to the makeup, thereby reproducing a skin tone identical to a skin of the user on which the makeup is applied in reality.

To achieve the foregoing, the apparatus 101 may generate spectrum information metadata, using the spectrum measuring apparatus. The apparatus 101 may provide a system for reproducing a realistic skin color using makeup avatar metadata, based on information on makeup applied to a three-dimensional (3D) facial avatar through a terminal device, for example, a tablet. In addition, the apparatus 101 may employ a method of reproducing a realistic skin color based on skin spectrum information and cosmetics spectrum information when makeup is applied using a virtual makeup tool.

In order to provide such a method, although not shown in FIG. 1, the apparatus 101 may include a spectrum information metadata generating unit to convert colors of cosmetics and a color of a skin measured by the spectrum measuring apparatus into spectrum information metadata, a data storage unit to store spectrum information, and a makeup information generating unit to generate makeup information related to makeup applied by the user using a virtual makeup tool. The apparatus 101 may further include an adaptive engine unit to control a makeup status of a makeup avatar based on the spectrum information and the makeup information, and a makeup avatar metadata generating unit to generate makeup avatar metadata, based on makeup avatar control information generated by the adaptive engine unit. The apparatus 101 may further include a virtual environment service unit to provide a realistic skin color reproducing service, and the like through a tablet, or other display devices based on the makeup avatar metadata, a terminal device to provide an actual service to the user and to receive an input of the makeup information, and the like.

Figure 2:
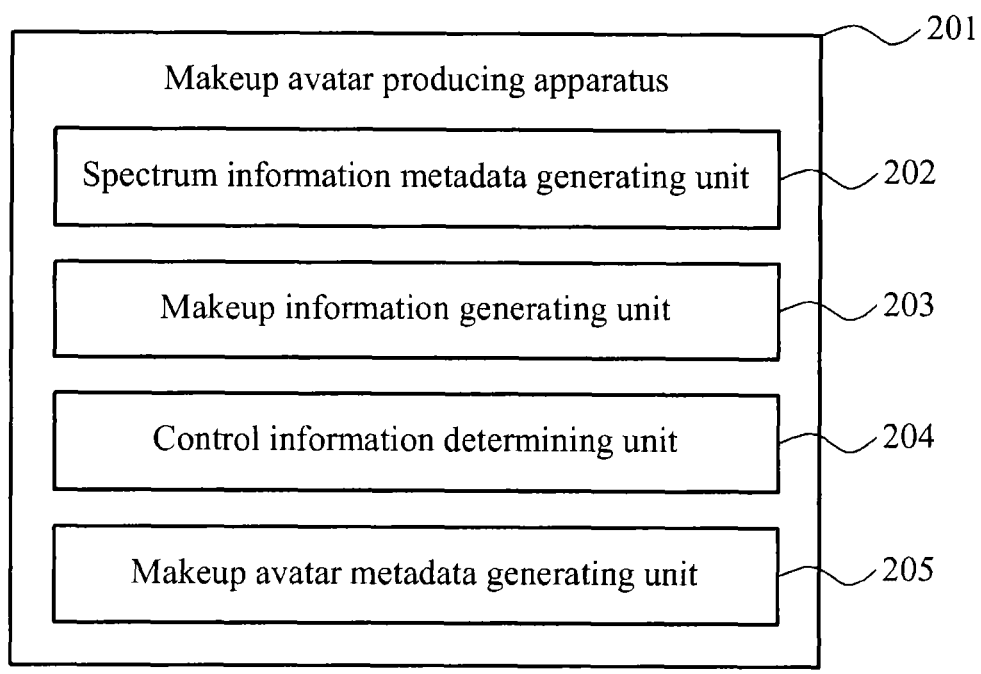
FIG. 2 is a block diagram illustrating a configuration of an apparatus for producing a makeup avatar according to an embodiment of the present invention.

FIG. 2 is a block diagram illustrating a configuration of an apparatus 201 for producing a makeup avatar according to an embodiment of the present invention.

Referring to FIG. 2, the apparatus 201 may include a spectrum information metadata generating unit 202, a makeup information generating unit 203, a control information determining unit 204, and a makeup avatar metadata generating unit 205.

The spectrum information metadata generating unit 202 may generate spectrum information metadata, based on skin spectrum information related to skin information of a user, and cosmetics spectrum information related to color information of cosmetics used for applying makeup. In this instance, the spectrum information metadata generating unit 202 may generate the spectrum information metadata by converting a skin color of the user and a cosmetics color measured by a spectrum measuring apparatus (not shown).

The spectrum information metadata generating unit 202 may generate the spectrum information metadata using a structured language. For example, the spectrum information metadata generating unit 202 may generate the spectrum information metadata in a form of an Extensible Markup Language (XML).

In particular, the spectrum information metadata generating unit 202 may refer to Table 1 through Table 4.

TABLE 1

```
<complexType name="SpectrumCameraSensorType">
  <complexContent>
    <extension base="siv:CameraSensorType">
      <sequence>
        <element name="Spectra" type="mpeg7:DoubleMatrixType"/>
      </sequence>
    </extension>
  </complexContent>
</complexType>
```

Table 1 shows a structured language for measuring skin spectrum information and cosmetics spectrum information using the spectrum measuring apparatus.

In Table 1, the spectrum information metadata generating unit 202 may measure spectrum information using the spectrum measuring apparatus. In this instance, the spectrum information may include the skin spectrum information and the cosmetics spectrum information. In addition, the spectrum information metadata generating unit 202 may extend information of the spectrum measuring apparatus in order to express the measured spectrum information. For example, the spectrum information metadata generating unit 202 may extend camera sensor information of the spectrum measuring apparatus defined in International Organization for Standardization and the International Electrotechnical Commission (ISO/IEC) 23005-5 to CameraSensorType. The spectrum information metadata generating unit 202 may use the measured spectrum information as a type of SensedInfo metadata in ISO/IEC 23005-5.

In addition, the spectrum information metadata generating unit 202 may generate Spectra metadata for describing the spectrum information measured by the spectrum measuring apparatus. The Spectra metadata may be defined as DoubleMatrixType expressing a real type matrix value defined in ISO/IEC 15938.

TABLE 2

```
<complexType name="MakeupAvatarType">
  <complexContent>
    <extension base="vwoc:AvatarType">
      <sequence>
        <element name="Cosmetic" type="vwoc:CosmeticType"/><element name="MakeupInfo" type="vwoc:MakeupInfoType" minOccurs="0" maxOccurs="unbounded"/>
      </sequence>
    </extension>
  </complexContent>
</complexType>
```

Table 2 shows a structured language for expressing a makeup avatar.

In Table 2, the spectrum information metadata generating unit 202 may express the makeup avatar. In this instance, the spectrum information metadata generating unit 202 may express the makeup avatar based on a skin spectrum among the spectrum information. The spectrum information metadata generating unit 202 may extend information related to the makeup avatar in order to express the makeup avatar. For example, the spectrum information metadata generating unit 202 may extend basic information of the makeup avatar defined in ISO/IEC 23005-4 to AvatarType. The spectrum information metadata generating unit 202 may use the extended information of the makeup avatar as a type of Avatar metadata in ISO/IEC 23005-4.

Further, the spectrum information metadata generating unit 202 may generate Cosmetic metadata describing cosmetics information. Also, the spectrum information metadata generating unit 202 may generate MakeupInfo metadata describing makeup information.

The spectrum information metadata generating unit 202 may generate a makeup avatar including ethnic information varying depending on the skin spectrum information.

TABLE 3

```
<complexType name="CosmeticType">
  <sequence>
    <element name="Color" type="vwoc:CosmeticSpectrumType"/>
    <element name="Characteristic" type="vwoc:CosmeticCharacteristicType" minOccurs="0"/>
    <element name="Category" type="mpeg7:termReferenceType" minOccurs="0"/>
  </sequence>
  <attribute name="name" type="string" use="optional"/>
  <attribute name="brand" type="string" use="optional"/>
  <attribute name="modelNumber" type="string" use="optional"/>
  <attribute name="colorNumber" type="string" use="optional"/>
</complexType>
<complexType name="CosmeticSpectrumType">
  <sequence>
    <choice>
      <element name="Spectra" type="mpeg7:DoubleMatrixType"/>
      <element name="SpectraURI" type="anyURI"/>
    </choice>
    <element name="CosmeticSpectrumTransformationModel" type="vwoc:PolynomialType"/>
  </sequence>
</complexType>
<complexType name="PolynomialType">
  <sequence>
    <element name="Monomial" type="vwoc:MonomialType" maxOccurs="unbounded"/>
  </sequence>
```

TABLE 3-continued

```
  </complexType>
  <complexType name="MonomialType">
    <sequence>
      <element name="Variable" type="vwoc:VariableType"
  minOccurs="0" maxOccurs="unbounded"/>
    </sequence>
    <attribute name="coefficient" type="double"
      use="optional"/>
  </complexType>
  <complexType name="VariableType">
    <simpleContent>
      <extension base="string">
        <attribute name="exponential" type="positiveInteger"
          use="optional"/>
      </extension>
    </simpleContent>
  </complexType>
  <complexType name="CosmeticCharacteristicType">
    <attribute name="form" type="vwoc:cosmeticFormType"
      use="optional"/>
    <attribute name="glossProperty" type="vwoc:glossPropertyType"
      use="optional"/>
    <attribute name="pearl" type="boolean" use="optional"/>
    <attribute name="transmittancy" type="double" use="optional"/>
  </complexType>
  <simpleType name="cosmeticFormType">
    <restriction base="string">
      <enumeration value="Solid"/>
      <enumeration value="Powder"/>
      <enumeration value="Liquid"/>
      <enumeration value="Cream"/>
      <enumeration value="Gel"/>
    </restriction>
  </simpleType>
  <simpleType name="glossPropertyType">
    <restriction base="string">
      <enumeration value="Glossy"/>
      <enumeration value="Matt"/>
    </restriction>
  </simpleType>
```

Table 3 shows a structured language for expressing cosmetics information.

In Table 3, in order to express the cosmetics information, the spectrum information metadata generating unit 202 may generate Color metadata expressing colors of cosmetics in a form of a spectrum, Characteristic metadata describing characteristic information of cosmetics, and Category metadata describing type information of cosmetics. In addition, the spectrum information metadata generating unit 202 may generate name attribute metadata indicating a name of a cosmetic, brand attribute metadata indicating brand information, for example, manufacturer information, modelNumber attribute metadata indicating a model number of a cosmetic, and colorNumber attribute metadata indicating a color number of a cosmetic.

In order to express colors of cosmetics in a form of a spectrum, the Color metadata describing color information of cosmetics may selectively describe at least one of Spectra metadata expressing spectrum data and SpectraURI metadata expressing a location of the spectrum data. The spectrum information metadata generating unit 202 may generate CosmeticSpectrumTransformationModel metadata expressing a result of applying a cosmetic color to a skin color as a function. In this instance, the makeup avatar may be used for converting a skin color by applying makeup based on the result of applying the cosmetic color to the skin color, when a spectrum of the skin color is combined with a spectrum of the cosmetic color.

CosmeticCharacteristic metadata expressing characteristics of cosmetics may include form attribute metadata indicating a form of a cosmetic, glossProperty attribute metadata indicating a degree of glossiness, pearl attribute metadata indicating whether pearls are used, and transmittancy attribute metadata indicating a transmittancy.

TABLE 4

```
  <complexType name="MakeupInfoType">
    <sequence>
      <element name="Tool" type="vwoc:MakeupToolType"/>
      <element name="Region" type="vwoc:MakeupRegionType"/>
    </sequence>
    <attribute name="nbrOfTouch" type="positiveInteger"
      use="required"/>
  </complexType>
  <complexType name="MakeupToolType">
    <sequence>
      <element name="Usage" type="mpeg7:termReferenceType"
        minOccurs="0"/>
    </sequence>
    <attribute name="toolType" type="vwoc:cosmeticToolType"
      use="optional"/>
    <attribute name="name" type="string" use="optional"/>
    <attribute name="brand" type="string" use="optional"/>
    <attribute name="modelNumber" type="string" use="optional"/>
    <attribute name="sizeNumber" type="string" use="optional"/>
  </complexType>
  <simpleType name="cosmeticToolType">
    <restriction base="string">
      <enumeration value="Brush"/>
      <enumeration value="Sponge"/>
      <enumeration value="Powder Puff"/>
      <enumeration value="Pen"/>
    </restriction>
  </simpleType>
  <complexType name="MakeupRegionType">
    <attribute name="region" type="vwoc:makeupRegionType"
      use="optional"/>
    <attribute name="regionNumber" type="vwoc:unsigned4Vector"
      use="optional"/>
  </complexType>
  <simpleType name="makeupRegionType">
    <restriction base="string">
      <enumeration value="All"/>
      <enumeration value="Lips"/>
      <enumeration value="Eyebrow"/>
      <enumeration value="Periocular"/>
      <enumeration value="Cheek"/>
      <enumeration value="Highlight"/>
      <enumeration value="Shadow"/>
      <enumeration value="Shading"/>
    </restriction>
  </simpleType>
  <simpleType name="unsigned4Vector">
    <list itemType="mpeg7:unsigned4"/>
  </simpleType>
```

Table 4 shows a structured language for expressing makeup information.

In Table 4, in order to express the makeup information, the spectrum information metadata generating unit 202 may generate Tool metadata indicating a cosmetic tool, Region metadata describing a makeup scope, for example, a makeup region, and nbrOfTouch attribute metadata describing a number of times makeup is applied.

In addition, the Tool metadata indicating a cosmetic tool may include Usage metadata indicating a range of usage of a makeup tool, toolType metadata expressing a form of a makeup tool, name attribute metadata indicating a name of a makeup tool, brand attribute metadata indicating brand information, for example, manufacturer information, modelNumber attribute metadata indicating a model number of a makeup tool, and sizeNumber attribute metadata indicating a size of a makeup tool.

In addition, the Region metadata describing a makeup scope, for example, a makeup region, may include region attribute metadata expressing a type of a makeup scope, and regionNumber attribute metadata expressing a location of a selected makeup scope. The makeup information generating unit 203 may generate makeup information of the generated makeup avatar. In this instance, the makeup information generating unit 203 may receive, from the user, the makeup avatar to which makeup is applied through a user terminal. The makeup information generating unit 203 may generate the makeup information based on the makeup avatar to which the makeup is applied. Here, the makeup information may include a virtual makeup tool used for applying the makeup, a makeup region, and the like.

In particular, the makeup information generating unit 203 may generate the makeup information including the virtual makeup tool used for applying the makeup to the makeup avatar, the makeup region, and the like, based on a result of applying the makeup to the makeup avatar through the user terminal by the user.

The control information determining unit 204 may determine control information for controlling a makeup status of the makeup avatar, based on the makeup information and the spectrum information metadata. The control information determining unit 204 may retrieve the skin spectrum information and the cosmetics spectrum information constituting the spectrum information metadata, based on the makeup information. In particular, the control information determining unit 204 may retrieve skin spectrum information and cosmetics spectrum information corresponding to the makeup information including cosmetics information, and skin information of the makeup avatar to which the makeup is applied using a virtual makeup tool.

The control information determining unit 204 may generate, based on the spectrum information metadata, the control information for controlling the makeup status of the makeup avatar based on the makeup information. The control information determining unit may generate the control information for reproducing the makeup avatar with enhanced reality based on the makeup information. In this instance, the control information may include information for reproducing a realistic skin color of the makeup avatar.

The makeup avatar metadata generating unit 205 may generate makeup avatar metadata, based on spectrum information metadata corresponding to the generated control information and the generated makeup information. The makeup avatar metadata generating unit 205 may generate the makeup avatar metadata for reproducing a skin of the makeup avatar to be identical to an actual makeup skin. In particular, the makeup avatar metadata generating unit 205 may combine the skin spectrum information with a color spectrum, based on the control information and the makeup information. The makeup avatar metadata generating unit 205 may combine the skin spectrum information with the color spectrum, thereby deriving more accurate and exquisite skin color information of the makeup avatar. In particular, the makeup avatar metadata generating unit 205 may combine the skin spectrum information with the color spectrum, thereby deriving a skin color similar to an actual makeup skin, with respect to the makeup avatar to which the makeup is applied by the user.

The apparatus 201 may generate spectrum information metadata, based on skin spectrum information and cosmetics spectrum information measured by the spectrum measuring apparatus. The apparatus 201 may generate a makeup avatar, based on the skin spectrum information. The apparatus 201 may generate makeup information of the makeup avatar to which makeup is applied through a user terminal of a user. The apparatus 201 may reproduce a realistic skin color of the makeup avatar, using the makeup avatar and the makeup information.

In addition, when the makeup is applied to the makeup avatar using a virtual makeup tool, the apparatus 201 may reproduce a realistic skin color based on the skin spectrum information and the cosmetics spectrum information.

Further, the apparatus 201 may provide, to the user terminal, the makeup avatar realistically reproduced based on the makeup information and the control information.

Figure 3:
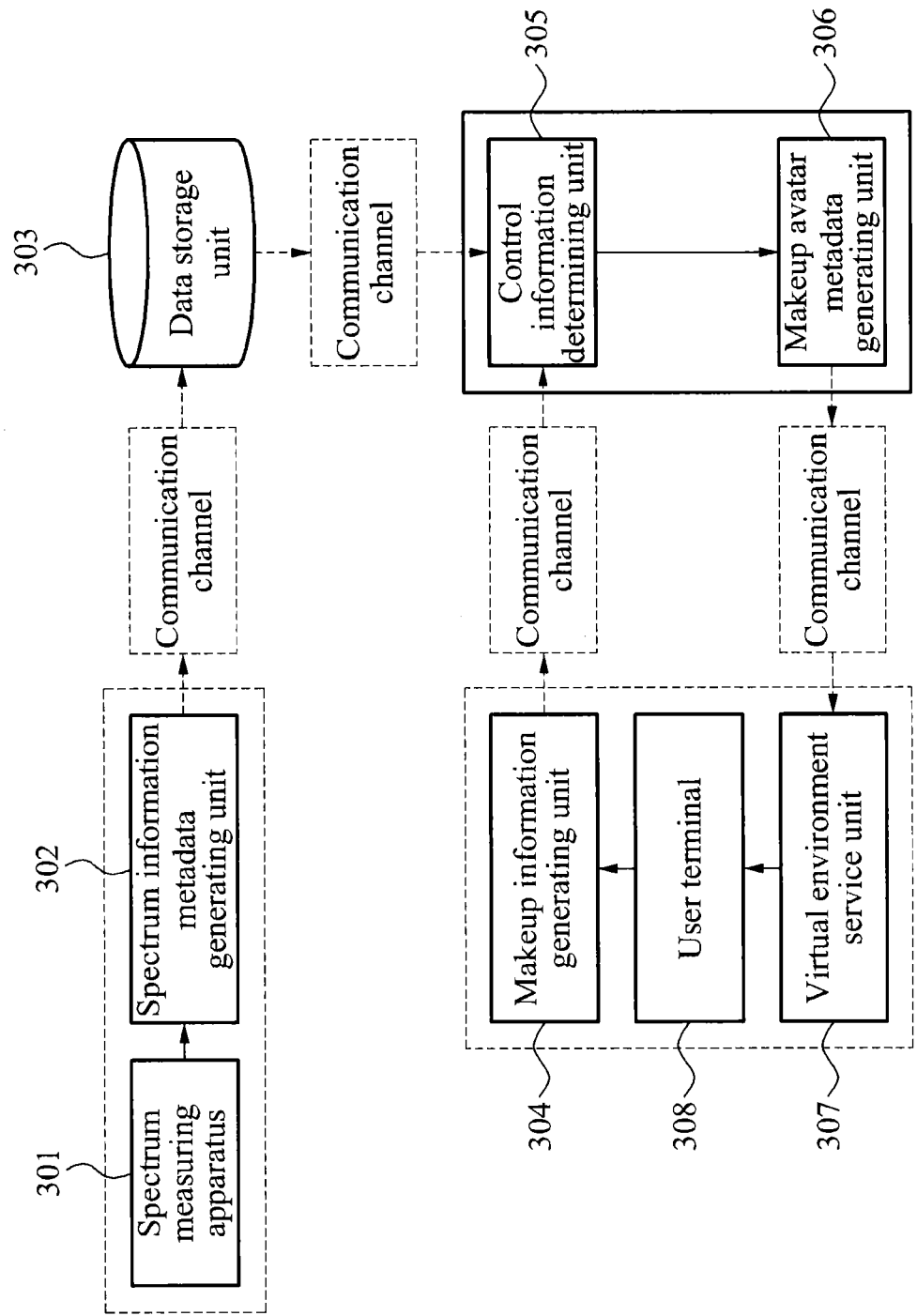
FIG. 3 is a diagram illustrating an apparatus for producing a makeup avatar according to an embodiment of the present invention.

FIG. 3 is a diagram illustrating an apparatus for producing a makeup avatar according to an embodiment of the present invention.

Referring to FIG. 3, a spectrum information metadata generating unit 302 may receive skin information of a user and cosmetics information related to makeup from a spectrum measuring apparatus 301.

The spectrum information metadata generating unit 302 may generate skin spectrum information corresponding to the received skin information of the user, and cosmetics spectrum information corresponding to the received cosmetics information. The generated spectrum information metadata may be stored in a data storage unit 303. In this instance, the spectrum information metadata may be transmitted to the data storage unit 303 via a communication channel of the apparatus.

A makeup information generating unit 304 may receive a makeup avatar to which the makeup is applied through a user terminal. In this instance, the user may apply the makeup to the makeup avatar through a user terminal 308. The makeup information generating unit 304 may generate makeup information, based on the received makeup avatar. In this instance, the makeup information generating unit 304 may generate the makeup information including, for example, a makeup tool used for applying the makeup, a makeup region, and the like, based on a result of applying the makeup to the received makeup avatar. Here, the makeup information may be transmitted to a control information determining unit 305 via the communication channel of the apparatus.

The control information determining unit 305 may generate control information for controlling a makeup status of the makeup avatar, based on the received makeup information and the spectrum information metadata. In this instance, the control information determining unit 305 may retrieve the spectrum information metadata stored in the data storage unit 303. For example, the control information determining unit 305 may retrieve skin spectrum information and cosmetics spectrum information corresponding to the makeup information. The control information determining unit 305 may generate, based on the makeup information, the control information for reproducing the makeup avatar with enhanced reality based on the skin spectrum information expressing a skin color of the user used in reality and the cosmetics spectrum information related to cosmetics used for applying the makeup. Here, the skin spectrum information and the cosmetics spectrum information may be applied to the makeup avatar.

A makeup avatar metadata generating unit 306 may generate makeup avatar metadata, based on spectrum information metadata corresponding to the generated control information and the generated makeup information. The makeup avatar metadata generating unit 306 may combine the skin spectrum information with a color spectrum based on the control information and the makeup information, thereby generating the makeup avatar metadata for reproducing a skin of the makeup avatar identical to an actual makeup skin. The makeup avatar metadata generating unit 306 may provide, to the user terminal 308, the makeup avatar of which a skin color is realistically reproduced based on the control information.

The apparatus may include the communication channel configured to connect the spectrum information metadata generating unit 302 to the data storage unit 303, the data storage unit 303 to the control information determining unit 305, the makeup avatar metadata generating unit 306 to the virtual environment service unit 307, and the makeup information generating unit 304 to the control information determining unit 305.

The communication channel may connect the aforementioned elements using a wired network, for example, an optical cable or a local area network (LAN) cable called an unshielded twisted pair (UTP) cable to transmit and receive data according to a specific communication protocol. The communication channel may be used to transmit and receive data using a wireless communication scheme. In particular, the communication channel may include a mobile communication channel, for example, a code division multiple access (CDMA) communication channel, a wideband code division multiple access (WCDMA) communication channel, and a frequency division multiple access (FDMA) communication channel, and a Bluetooth communication channel, a wireless broadband (WiBro) communication channel, a wireless local area network (WLAN) communication channel, and the like. The communication channel is not limited to the aforementioned communication channels, and may be used for communication using varied communication schemes of transmitting and receiving data.

The spectrum information metadata generating unit 302 may generate spectrum information metadata, based on values input from the spectrum measuring apparatus 301. The spectrum information metadata generating unit 302 may transmit the generated spectrum information metadata to the data storage unit 303, via the communication channel. The data storage unit 303 may store the received spectrum information metadata. The makeup information generating unit 304 may generate makeup information, based on a result of applying makeup, by a user, to a makeup avatar of a virtual world using a virtual makeup tool through the user terminal 308. The makeup information generating unit 304 may transmit the generated makeup information to the control information determining unit 305, via the communication channel. The control information determining unit 305 may retrieve skin spectrum information indicating a skin color of the user of the real world to be applied to the makeup avatar, and cosmetics spectrum information indicating color information of cosmetics used for applying the makeup, from the data storage unit 303. The control information determining unit 305 may generate control information for controlling a makeup status of the makeup avatar, based on the makeup information received from the makeup information generating unit 304. The control information determining unit 305 may transmit the generated control information to the avatar metadata generating unit 306. The makeup avatar metadata generating unit 306 may generate makeup avatar metadata, and transmit the makeup avatar metadata to the virtual environment service unit 307, via the communication channel. The virtual environment service unit 307 may provide a realistic skin color reproducing service through the user terminal 308, based on the received makeup to avatar metadata.

Figure 4:
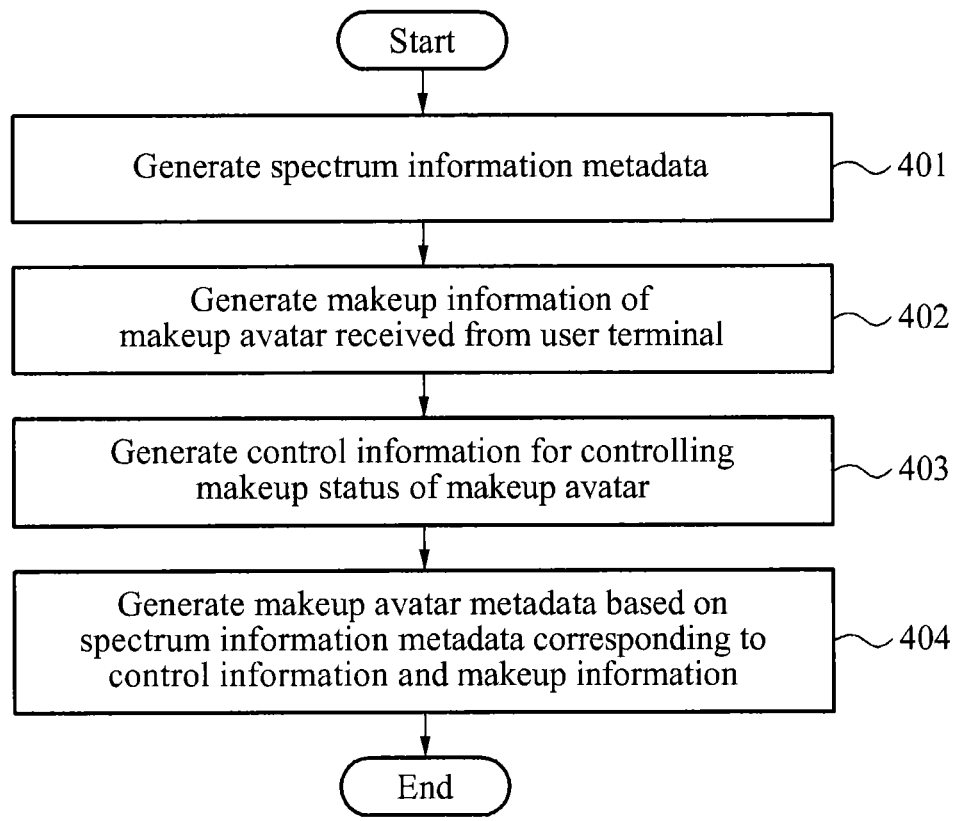
FIG. 4 is a diagram illustrating a method of producing a makeup avatar according to an embodiment of the present invention.

FIG. 4 is a diagram illustrating a method of producing a makeup avatar according to an embodiment of the present invention.

Referring to FIG. 4, in operation 401, an apparatus for producing a makeup avatar may generate spectrum information metadata, based on skin spectrum information corresponding to skin information of a user, and cosmetics spectrum information related to color information of cosmetics used for applying makeup. In this instance, the apparatus may generate the spectrum information metadata, by converting a color of cosmetics and a skin color of the user measured by a spectrum measuring apparatus.

The apparatus may generate the spectrum information metadata, in a form of an XML schema of a structured language. The apparatus may measure the skin spectrum information and the cosmetics spectrum information, using the XML. In addition, the apparatus may express a makeup avatar using the XML.

In operation 402, the apparatus may generate makeup information of the makeup avatar received through a user terminal. In particular, the apparatus may receive a makeup avatar to which makeup is applied through the user terminal by the user. The apparatus may generate the makeup information including a makeup tool used for applying the makeup, a makeup region, and the like, based on a result of applying the makeup to the makeup avatar.

In operation 403, the apparatus may generate control information for controlling a makeup status of the makeup avatar. In particular, the apparatus may determine the control information for controlling the makeup status of the makeup avatar based on the makeup information and the spectrum information metadata. The control information determining unit 204 may generate the control information for reproducing the makeup avatar with enhanced reality based on the makeup information. Here, the control information may refer to information for reproducing a realistic skin color of the makeup avatar.

In operation 404, the apparatus may generate makeup avatar metadata, based on the generated control information and spectrum information metadata corresponding to the makeup information. The apparatus may combine skin spectrum information with a color spectrum, based on the control information and the makeup information. The apparatus may combine the skin spectrum information with the color spectrum, thereby deriving more accurate and exquisite skin color information after applying the makeup. In particular, the apparatus may combine the skin spectrum information with the color spectrum, thereby deriving a skin color similar to a makeup skin in reality, with respect to the makeup avatar to which the makeup is applied by the user.

According to exemplary embodiments of the present invention, an apparatus for producing a makeup avatar may apply makeup to a makeup avatar using skin spectrum information of a user and cosmetics spectrum information related to makeup, thereby reproducing a realistic skin color with a skin tone identical to a skin tone of the user to which makeup is applied in reality.

According to exemplary embodiments of the present invention, an apparatus for producing a makeup avatar may reproduce a realistic skin color of a makeup avatar with a skin tone identical to a skin tone of a user to which makeup is applied in reality, thereby reducing expenses and time to be expended on a planning meeting relating to makeup in a broadcasting field, a theater field, and the like requiring normal makeup or special effects makeup.

According to exemplary embodiments of the present invention, an apparatus for producing a makeup avatar may reproduce a realistic skin color of a makeup avatar with a skin tone identical to a skin tone of a user to which makeup is applied in reality, thereby alleviating wasting of makeup resources and environmental pollution issues occurring during an education in an educational field of normal makeup or special effects makeup.

The above-described exemplary embodiments of the present invention may be recorded in computer-readable media including program instructions to implement various to operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus producing a makeup avatar, the apparatus comprising:
a computer hardware communicatively coupled to a display, the computer hardware configured to:
generate spectrum camera sensor metadata, based on skin spectrum information of a user and cosmetics spectrum information identifying an attribute of a makeup indicated by a manufacturer;
receive, from a terminal of the user, an input pertaining to a makeup avatar to which makeup is applied, and to generate makeup information of the makeup avatar according to the input;
determine control information for a makeup status of the makeup avatar, based on the makeup information and the spectrum camera sensor metadata; and
generate makeup avatar metadata for the makeup avatar that is displayable on the display, based on the control information,
wherein the makeup avatar metadata is generated by referring to the skin spectrum information of the user and the attribute of the makeup identified in the cosmetics spectrum information so that the makeup avatar is produced to represent realistic application of the makeup to the user, and
wherein the spectrum camera sensor metadata includes real-valued matrix indicating spectrum of the skin spectrum information and the cosmetics spectrum information.

2. The apparatus of claim 1, wherein the apparatus producing the makeup avatar generates the spectrum camera sensor metadata, based on skin spectrum information corresponding to skin information of the user, and cosmetics spectrum information related to color information of cosmetics.

3. The apparatus of claim 1, wherein the makeup avatar comprises ethnic information varying depending on the skin spectrum information.

4. The apparatus of claim 1, wherein the makeup information comprises at least one of a makeup region and a makeup tool used for applying the makeup, based on a result of applying the makeup to the makeup avatar.

5. The apparatus of claim 1, wherein the apparatus producing the makeup avatar generates the makeup avatar metadata, by extracting skin spectrum information indicating skin information of the makeup avatar based on the makeup information.

6. The apparatus of claim 5, wherein the apparatus producing the makeup avatar generates, based on the control information, makeup avatar metadata for the makeup avatar of which the makeup status is controlled based on the extracted skin spectrum information and the extracted cosmetics spectrum information.

7. The apparatus of claim 1, wherein the apparatus producing the makeup avatar generates the makeup avatar metadata, by extracting cosmetics spectrum information related to information on cosmetics used for applying the makeup to the makeup avatar based on the makeup information.

8. The apparatus of claim 1, wherein the apparatus producing the makeup avatar generates the makeup avatar metadata for reproducing a skin of the makeup avatar to be identical to an actual makeup skin.

9. A method of producing a makeup avatar, the method comprising:
the method causing an operation to be implemented by a computer hardware coupled to a display, the operation including:
generating spectrum camera sensor metadata, based on skin spectrum information of a user and cosmetics spectrum information identifying an attribute of a makeup indicated by a manufacturer;
receiving, from a terminal of the user, an input pertaining to a makeup avatar to which makeup is applied, and generating makeup information of the makeup avatar;
determining control information for controlling a makeup status of the makeup avatar, based on the makeup information and the spectrum camera sensor metadata; and
generating makeup avatar metadata for the makeup avatar that is displayable on the display based on the control information,
wherein the makeup avatar metadata is generated by referring to the skin spectrum information of the user and the attribute of the makeup identified in the cosmetics spectrum information so that the makeup avatar is produced to represent realistic application of the makeup to the user, and
wherein the spectrum camera sensor metadata includes real-valued matrix indicating spectrum of the skin spectrum information and the cosmetics spectrum information.

10. The method of claim 9, wherein the generating of the spectrum camera sensor metadata comprises generating the spectrum camera sensor metadata, based on skin spectrum information corresponding to skin information of the user, and cosmetics spectrum information related to color information of cosmetics.

11. The method of claim 9, wherein the makeup avatar comprises ethnic information varying depending on the skin spectrum information.

12. The method of claim 9, wherein the generating of the makeup information of the makeup avatar comprises generating makeup information comprising at least one of a makeup region and a makeup tool used for applying the makeup, based on a result of applying the makeup to the makeup avatar.

13. The method of claim 9, wherein the generating of the makeup avatar metadata comprises generating the makeup avatar metadata, by extracting skin spectrum information indicating skin information of the makeup avatar based on the makeup information.

14. The method of claim 13, wherein the generating of the makeup avatar metadata comprises generating, based on the control information, makeup avatar metadata for the makeup avatar of which the makeup status is controlled based on the extracted skin spectrum information and the extracted cosmetics spectrum information.

15. The method of claim 9, wherein the generating of the makeup avatar metadata comprises generating the makeup avatar metadata, by extracting cosmetics spectrum information related to information on cosmetics used for applying the makeup to the makeup avatar based on the makeup information.

16. The method of claim 9, wherein the generating of the makeup avatar metadata comprises generating makeup avatar metadata for reproducing a skin of the makeup avatar identical to an actual makeup skin.

* * * * *